(12) United States Patent
Henzie et al.

(10) Patent No.: US 8,959,605 B2
(45) Date of Patent: Feb. 17, 2015

(54) SYSTEM AND METHOD FOR ASSET LEASE MANAGEMENT

(75) Inventors: Justin J. Henzie, Oxted (GB); Amine El Kamel, San Francisco, CA (US); William Luh, San Jose, CA (US); Augustin J. Farrugia, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/326,234

(22) Filed: Dec. 14, 2011

(65) Prior Publication Data

US 2013/0160145 A1    Jun. 20, 2013

(51) Int. Cl.
G06F 7/04    (2006.01)

(52) U.S. Cl.
USPC .................................. 726/6; 726/29

(58) Field of Classification Search
CPC ... H04L 63/0428; H04L 63/068; H04L 63/08; H04L 63/10; H04L 63/108; G06F 21/31
See application file for complete search history.

(56) References Cited

U.S. PATENT DOCUMENTS

| | | | |
|---|---|---|---|
| 7,076,563 B1 | 7/2006 | Yamanaka et al. | |
| 7,254,596 B2 | 8/2007 | De Spiegeleer | |
| 7,480,939 B1* | 1/2009 | Nessett et al. | 726/22 |
| 7,840,437 B2* | 11/2010 | Lewis | 705/14.26 |
| 8,090,851 B2* | 1/2012 | Chong et al. | 709/229 |
| 8,321,948 B2* | 11/2012 | Robinson et al. | 726/26 |
| 2001/0000812 A1* | 5/2001 | Waldo et al. | 709/225 |
| 2002/0026478 A1 | 2/2002 | Rodgers et al. | |
| 2002/0032905 A1* | 3/2002 | Sherr et al. | 725/38 |
| 2004/0024688 A1 | 2/2004 | Bi et al. | |
| 2005/0138357 A1 | 6/2005 | Swenson et al. | |
| 2005/0138406 A1* | 6/2005 | Cox | 713/200 |

(Continued)

FOREIGN PATENT DOCUMENTS

| | | |
|---|---|---|
| WO | 00/62265 | 10/2000 |
| WO | 2004/025431 | 5/2004 |

(Continued)

OTHER PUBLICATIONS

Anoop Ninan et al., "Cooperative Leases: Scalable Consistency Maintenance in Content Distribution Networks", May 7-11, 2002, WWW2002, pp. 1-12.*

(Continued)

*Primary Examiner* — Jeffrey Pwu
*Assistant Examiner* — Carlos Amorin
(74) *Attorney, Agent, or Firm* — Novak Druce Connolly Bove + Quigg LLP

(57) ABSTRACT

Disclosed herein are systems, methods, and non-transitory computer-readable storage media for asset lease management. The system receives, from a client device associated with a user profile, a lease start request for an asset for which the user profile is authorized. The system identifies a number of available slots for progressively downloading content. If the number of available slots is greater than zero, the system assigns an available slot from the number of available slots to the client device to yield an assigned slot. The system transmits security information, a lease key, and a lease duration associated with the assigned slot to the client device in response to the lease start request, wherein the security information and lease key allow the client device to start a progressive download of the asset for the lease duration. At the end of the lease, the system terminates the lease and releases the assigned slot.

20 Claims, 11 Drawing Sheets

(56) References Cited

U.S. PATENT DOCUMENTS

| | | | |
|---|---|---|---|
| 2005/0138410 A1* | 6/2005 | Masuouka et al. | 713/200 |
| 2006/0041751 A1* | 2/2006 | Rogers et al. | 713/171 |
| 2006/0085648 A1* | 4/2006 | Cheston et al. | 713/182 |
| 2006/0161635 A1 | 7/2006 | Lamkin et al. | |
| 2007/0005961 A1* | 1/2007 | Hamblin et al. | 713/167 |
| 2007/0174471 A1* | 7/2007 | Van Rossum | 709/229 |
| 2007/0294660 A1* | 12/2007 | Chong et al. | 717/103 |
| 2008/0046377 A1* | 2/2008 | Major et al. | 705/57 |
| 2008/0280623 A1 | 11/2008 | Danne et al. | |
| 2009/0006620 A1* | 1/2009 | Belgaied et al. | 709/225 |
| 2009/0240947 A1* | 9/2009 | Goyal et al. | 713/176 |
| 2009/0249488 A1* | 10/2009 | Robinson et al. | 726/26 |
| 2010/0061549 A1* | 3/2010 | Seo et al. | 380/42 |
| 2010/0083300 A1* | 4/2010 | Lyou et al. | 725/27 |
| 2010/0268621 A1* | 10/2010 | Takechi et al. | 705/27 |
| 2011/0093930 A1 | 4/2011 | Bartel-Kurz et al. | |
| 2011/0107437 A1* | 5/2011 | Goyal et al. | 726/30 |
| 2011/0138174 A1* | 6/2011 | Aciicmez et al. | 713/165 |
| 2011/0138445 A1* | 6/2011 | Chasen et al. | 726/3 |
| 2011/0154443 A1* | 6/2011 | Thakur et al. | 726/3 |
| 2011/0231939 A1* | 9/2011 | Mann et al. | 726/27 |
| 2011/0265185 A1* | 10/2011 | Lewis et al. | 726/26 |
| 2012/0079578 A1 | 3/2012 | Dachiraju et al. | |
| 2012/0110338 A1* | 5/2012 | Druschel et al. | 713/182 |
| 2012/0216288 A1* | 8/2012 | Sheymov et al. | 726/26 |
| 2012/0246744 A1 | 9/2012 | Kagawa | |
| 2013/0133082 A1* | 5/2013 | Read et al. | 726/27 |

FOREIGN PATENT DOCUMENTS

| | | |
|---|---|---|
| WO | 2009/067156 | 8/2009 |
| WO | 2011/068784 | 6/2011 |

OTHER PUBLICATIONS

"Ouicktime Streaming Server, Darwin Streaming Server, Administrator's Guide", Retrieved from the Internet: http://manuals.info.apple.com/en_US/QuickTimeStreamingSrvrAdminGuide.pdf, XP055110918, Nov. 20, 2002, 86 pages.

Fecheyr-Lippens, Andrew , "A Review of HTTP Live Streaming", XP002638990, Retrieved from the Internet: http://issuu.com/andruby/docs/http_live_streaming, Jan. 25, 2010, 38 pages.

Yin, Hao et al., "TrustStream: A Secure and Scalable Architecture for Large-Scale Internet Media Streaming", IEEE Transactions on circuits and systems for video technology, IEEE service center, Piscataway, NJ, US, vol. 18, No. 12, XP011227826, Dec. 1, 2008, 12 pages.

* cited by examiner

SYSTEM AND METHOD FOR ASSET LEASE MANAGEMENT

BACKGROUND

1. Technical Field

The present disclosure relates to content delivery and more specifically to asset lease management for content delivery.

2. Introduction

Media content providers are exploring new distribution methods for media content. Internet and portable media device playback have joined the ranks of broadcast and cable television as major distribution outlets for television shows, user-generated content, movies, radio broadcasts, music, etc. Indeed, many users prefer to rent and access media content over a network, rather than purchasing or renting a physical copy of the media content. However, network-based distribution methods have sparked unique security concerns. Media content is uniquely susceptible to theft and attacks when transmitted over a network. Protecting media content transferred over a network is thus a great challenge for media content providers.

Currently, media content providers implement various security strategies to obviate the security risks of network-based media distribution methods. Often, media content providers implement digital rights management (DRM) technologies to protect the media content. DRM technologies attempt to control usage of media content by preventing or limiting unauthorized access to the media content and hindering attempts to copy or convert the data to another format. The DRM process typically involves encrypting the piece of content in order to restrict usage to those who have been granted a right to the content and prevent unauthorized access. Unfortunately, malicious or mischievous individuals with enough time and resources often find ways to bypass DRM restrictions.

Other media content protection schemes generally work by means of security through obscurity, security by design, encryption, and other methods. But even a blend of these approaches is often insufficient to keep out a determined "hacker" or "cracker." As a result, unauthorized users are able to access and use the media content, often restricting the authorized user's access to the media content. Accordingly, what is needed in the art is an improved way to protect and manage network access of media content.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to securely and efficiently perform asset lease management. Disclosed are systems, methods, and non-transitory computer-readable storage media for asset lease management. The method is discussed in terms of a system configured to practice the method. The system receives, from a client device associated with a user profile, a lease start request for media content for which the user profile is authorized. The system can use the user profile to authenticate the lease start request and/or to identify the client device and/or the user submitting the request. The client device can identify the user submitting the request based on the user profile.

The system then identifies a number of available slots for progressively downloading content. If the number of available slots is zero, the system sends a rejection notification to the client device in response to the lease start request. On the other hand, if the number of available slots is greater than zero, the system assigns an available slot from the number of available slots to the client device to yield an assigned slot. The system then transmits security information, a lease key, and a lease duration associated with the assigned slot to the client device in response to the lease start request, wherein the security information and lease key allow the client device to start a progressive download of the media content for the lease duration. At the end of the lease duration, the system terminates the lease and releases the assigned slot. The system can also terminate the lease and release the assigned slot before the end of the lease duration, in response to a lease stop request from the client device.

In one embodiment, the lease duration is shorter than the playback duration of the media content in order to require the client device to renew the lease at least once throughout the playback duration of the asset. The client device can extend the lease duration by sending a lease renewal request to the system prior to the end of the lease. If necessary, the client device can send several lease renewal requests to continue extending the lease until the end of the playback duration. The lease renewal requirement can serve as a second layer of protection, as it can frustrate attack and forgery attempts. The lease renewal requirement also can prevent a stale or unused lease from unnecessarily tying resources, and can allow the system to reassign such resources to service new/active leases.

The client device receives the security information, lease key, and lease duration and stores the information. The client device can store the security information in kernel space to protect it against tampering, as access to the kernel space is typically restricted. Alternatively, the client device can store the lease key in kernel space to protect it against tampering. The client device can store the security information, the lease key, and/or the lease duration in kernel space to protect the information against tampering. The client device can store at least one of the security information, the lease key, and the lease duration in a memory region protected by at least one of an access control list, an encryption key, a policy, file system permissions, share permissions, etc.

Further, the client device can use the information to enforce the lease duration. In one embodiment, the client device enforces the timeout in kernel space to prevent forgery and user manipulation of the timeout period. The timeout effectively translates to corruption of all security information, meaning that the asset cannot be decrypted after the timeout. Moreover, the client device can use encryption and/or hashing functions to protect any messages it sends to the system. In one embodiment, the client device uses a hash-based message authentication code (HMAC) key to compute a digest of the message it plans to send to the system. The HMAC key is based on a global unique identifier, a random identifier, a client device type, and/or the current time. Then, the client device encrypts the digest and the message with an anti-replay key, and sends the bundle to the system.

In contrast to systems in which a user "signs in" and remains signed in as long as the user does not sign out, a leasing arrangement can require the user and/or the user's device to continually or periodically sign in during media playback before the lease duration runs out. This has the added security benefit of not keeping security information on disk once the lease has expired, and adds freshness to the security information each time a lease is requested. In addition, hackers are thwarted by the time-out mechanism if they forge a stop request hoping to release a slot while continuing playback.

In some media streaming implementations, a user can authorize up to a maximum number of different machines with a single account. Then, when a user sells one of the different machines and forgets to deauthorize the machine, one of the authorizations is 'occupied'. Then, the only way to deauthorize a machine no longer in the user's possession is to use a "once-a-year" feature that de-authorizes all machines. The leasing approaches set forth herein do not have these shortcomings, as slot expiration on the server-side automatically releases the slot for re-use.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for an improved way to perform asset lease management. A system, method and non-transitory computer-readable media are disclosed which securely and efficiently perform asset lease management. A brief introductory description of a basic general purpose system or computing device in FIG. 1, which can be employed to practice the concepts, is disclosed herein. A more detailed description of asset lease management and related approaches will then follow. Multiple variations shall be discussed herein as the various embodiments are set forth. The disclosure now turns to FIG. 1.

Figure 1:
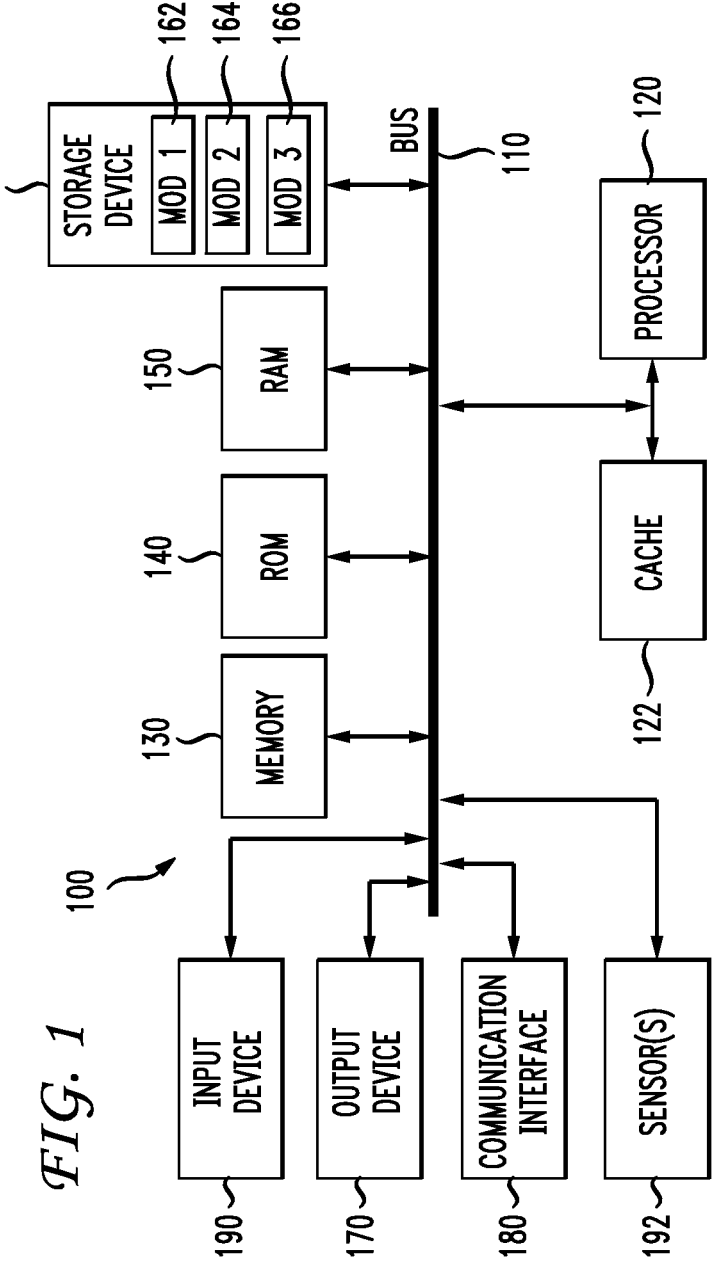
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and/or other sensor(s) 192. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored as would be known in the art in other computer-readable memory locations.

Figure 2:
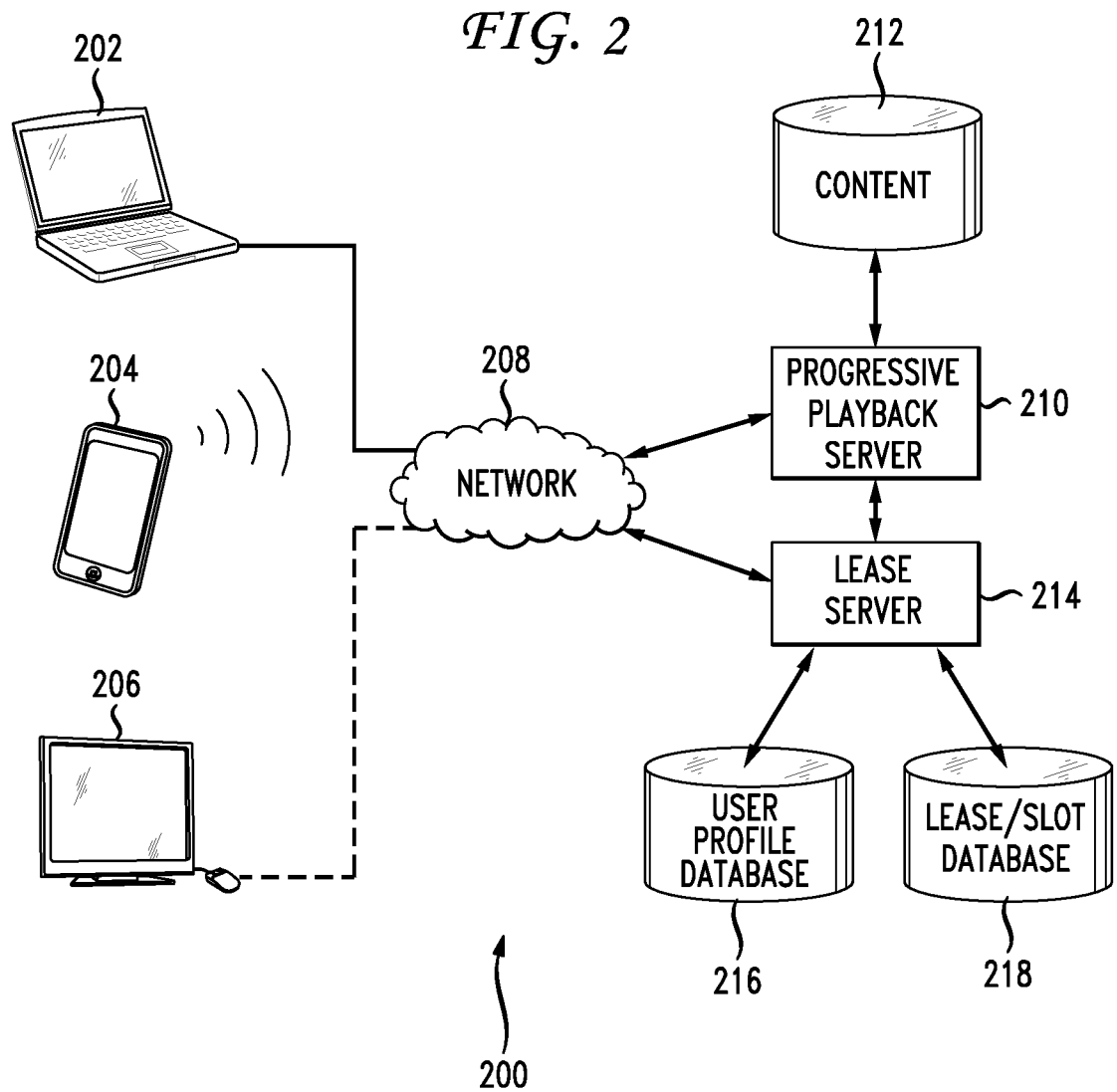
FIG. 2 illustrates an example network infrastructure for asset lease management.

Having disclosed some components of a computing system, the disclosure now turns to FIG. 2, which illustrates an example network infrastructure 200 for asset lease management. Here, the client devices 202, 204, 206 communicate with a progressive playback server 210 and a lease server 214 to obtain a lease for media content and progressively download the media content for playback. The client devices 202, 204, 206 can be any device with networking capabilities, such as a mobile phone, a computer, a media server and/or receiver, a television, a network media player, a video game console, etc. In FIG. 2, the client devices 202, 204, 206 include a laptop computer 202, a mobile phone 204, and a digital media receiver 206.

In one embodiment, the client devices 202, 204, 206 communicate with the progressive playback server 210 and the lease server 214 via a network 208. The network 208 can be a public network, such as the Internet, but can also include a private or quasi-private network, such as a local area network, an internal corporate network, a virtual private network (VPN), and so forth. The client devices 202, 204, 206 can connect to the network 208 via a wired or wireless connection. For example, the client devices 202, 204, 206 can be configured to use an antenna, a modem, or a network interface card to connect to the network 208 via a wireless or wired network connection. In FIG. 2, the laptop computer 202 connects to the network 208 via a wired network connection using a network interface card, the mobile phone 204 connects to the network 208 via a wireless connection using an antenna, and the digital media receiver 206 connects to the network 208 via a wireless connection using a wireless network interface card.

The lease server 214 provides asset lease management. The lease server 214 can be an application hosted on one or more servers. In one embodiment, the lease server 214 communicates with a user profile database 216 that stores and retrieves user profile information. Here, the lease server 214 also connects to a lease/slot database 218 to store and retrieve lease and slot information, which can include session information, resource information, security information, lease information, content information, user information, scheduling information, service availability, etc. The user profile database 216 and the lease/slot database 218 can be hosted on the lease server 214 and/or one or more separate servers. Moreover, while the user profile database 216 and the lease/slot database 218 in FIG. 2 are illustrated as two separate databases, a person skilled in the art will readily recognize that the information can be stored on a single database.

The lease server 214 communicates with a progressive playback server 210 via an operating system, a data cable, a processor, and/or a network connection. The progressive playback server 210 can be an application hosted on the lease server 214, an application hosted on one or more separate servers, a content database, a content storage device, etc. The progressive playback server 210 provides media content to the client devices 202, 204, 206 according to lease information on the lease server 214. In one embodiment, the progressive playback server 210 communicates with a content storage unit 212 to access, schedule, share, send, and/or manage media content stored on the content storage unit 212. The progressive playback server 210 can connect to the content storage unit 212 via a data cable, a processor, a data connector, and/or a network connection.

The content storage unit 212 can reside on the same server as the progressive playback server 210, or one or more separate servers/devices. Moreover, the content storage unit 212 can include a storage device such as a hard disk drive, a magnetic disk drive, a solid-state drive, an optical disk drive, a tape drive, a redundant array of inexpensive disks (RAID), or the like.

Figure 3:
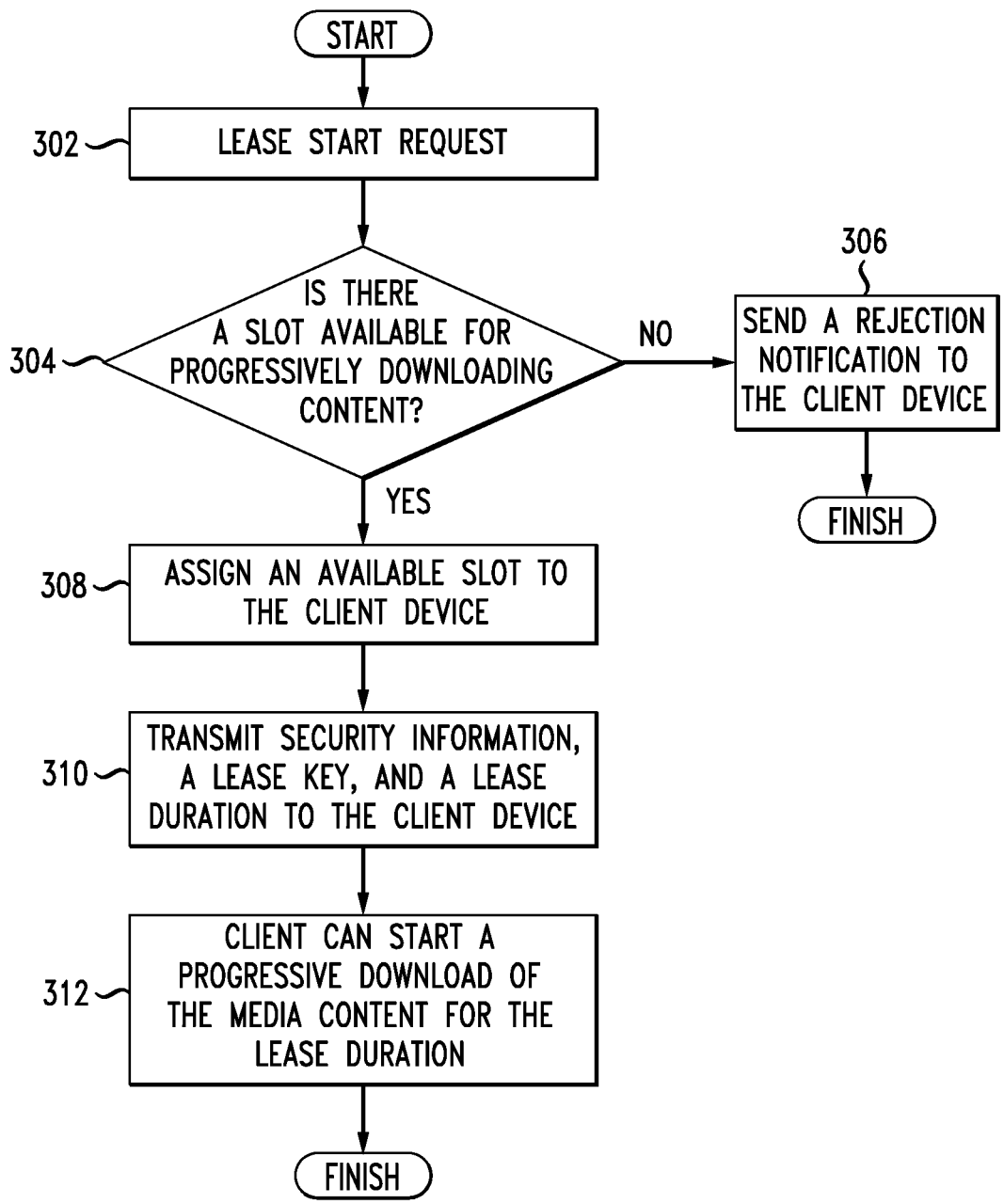
FIG. 3 illustrates an example flowchart for starting an asset lease.
Figure 4:
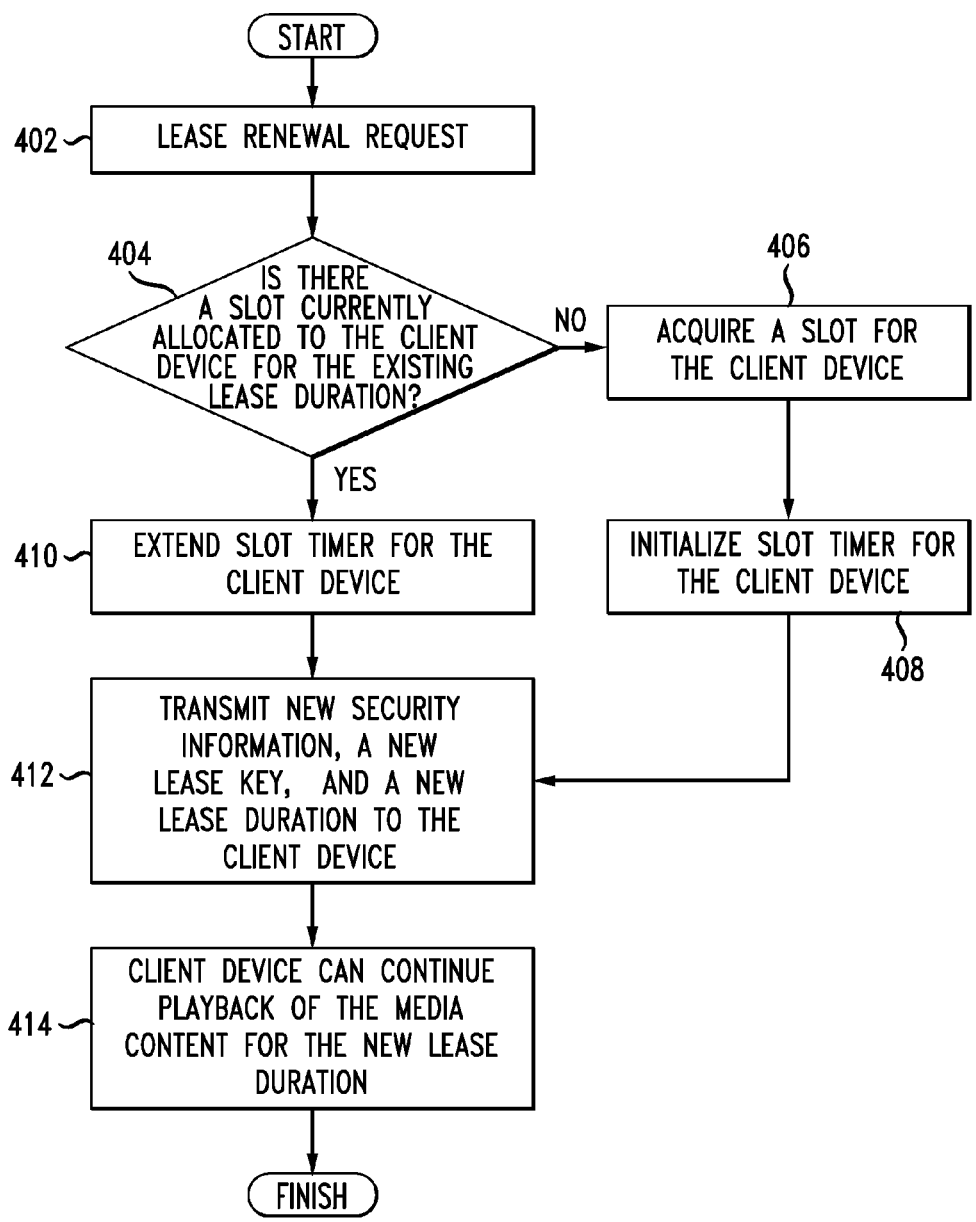
FIG. 4 illustrates an example flowchart for renewing an asset lease.
Figure 5:
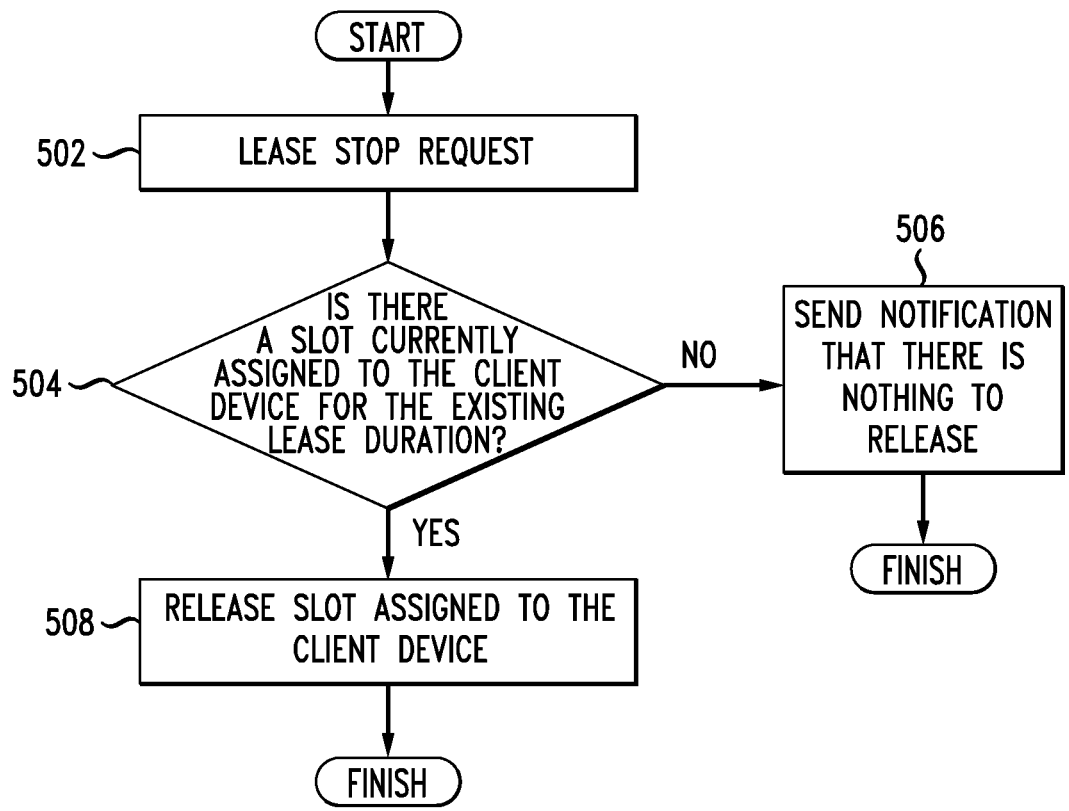
FIG. 5 illustrates an example flowchart for stopping an asset lease.

The disclosure now turns to FIGS. 3, 4, and 5, which illustrate exemplary process operations. FIG. 3 illustrates an example flowchart for starting an asset lease. In this example, a lease server first receives a lease start request (302). The lease start request originates from a client device such as, for example, a mobile phone, a laptop computer, a media player, etc. Here, the client device is associated with a user profile, which the lease server uses to authenticate the lease start request, identify the client device, and/or identify the user submitting the request.

In one embodiment, a user profile is linked to the client device such that the client device is authorized to access content from the lease server for the specific user profile. For example, the user profile can include a preference setting that defines the client device as an authorized device for that user profile. The lease server can then use the user profile to validate the lease start request from the client device. In another embodiment, the client device includes user profile information in the lease start request to associate the lease start request with the user profile. For example, before transmitting the lease start request to the lease server, the client device can prompt the user to authorize/authenticate the lease start request by entering his or her account credentials. The client device can then include the account credentials and/or corresponding user profile information in the lease start request.

A user profile can include a user name, a user identifier, a user group, a user address, a global user identifier, etc. Further, a user profile can be associated with one or more client devices, and a client device can be associated with one or more user profiles. The user profile can be associated with three different client devices, or with two different client devices, for example. However, in some cases the system imposes an upper limit on the number of devices with which the user profile may be associated. In other cases, the system can allow any device a slot to lease an asset as long as a slot is available.

The lease server then determines if a slot is available for progressively downloading content (304). A slot can be a session, a lease, a resource, a node, a schedule, a thread, an object, a module, a transmission medium, and so forth. In one embodiment, the lease server checks if a session is available on the lease server for servicing the lease start request. The lease server can check the status of one or more network nodes to determine if a network node is available for servicing the lease start request. The lease server can check the status of a media asset and determines, based on the server load, whether the server can service the lease start request. In still another embodiment, the lease server checks if a lease is available for the user profile to progressively download content.

If the lease server determines that a slot is not available for progressively downloading content, the system 100 sends a rejection notification to the client device (306), which terminates the lease start request. On the other hand, if the lease server determines that a slot is available for progressively downloading content, the lease server assigns an available slot to the client device (308). After assigning an available slot to the client device, the lease server transmits security information, a lease key, and a lease duration to the client device (310). To transmit the information, the lease server can use one or more protocols, such as TCP, UDP, RTP, RTSP, RTCP, SSH, TLS/SSL, SIP, SDP, FTP, HTTP, and so forth. Other communication and/or transmission protocols yet to be developed can also be used. According to one embodiment, the client device receives the security information, lease key, and lease duration and stores the information in kernel space. Here, the client device uses the stored information, which is protected against tampering, to enforce the lease duration accordingly.

The security information can include, among other things, an operation identifier, a request identifier, a user account identifier, a lease identifier, a status, a session identifier, a media content identifier, a resource identifier, a globally unique identifier, etc. In one embodiment, the security information includes part of the lease key. The lease key is a security key that protects the lease information, and can be used to verify data integrity and authenticity. The lease key can be generated by the lease server using a hash function, for example. The lease duration can be based on a policy, a schedule, a media asset, a server load, a request type, a time/date of request, etc. The lease duration can be set to ten minutes, or some other fixed duration. The lease duration can be set according to a policy that requires the lease duration to be shorter than the playback duration of the media content requested. The lease duration can be a specific percentage of the playback duration of the media content requested. The security information can be protected with an anti-replay key and a digest, both generated according to an algorithm.

Further, the lease server can encrypt all or part of the security information, the lease key, and/or the lease duration it sends to the client device. The lease server can encrypt the data with a key generated by computing a message digest of a portion of the data. However, the lease server can encrypt the data with a random key and/or encrypts part of the data using a secret key. The secret key can be obfuscated on the client side.

After receiving the security information, lease key, and lease duration from the lease server, the client device can start a progressive download of the media content for the lease duration (312). The security information and the lease key allow the client device to start a progressive download/playback of the media content for the specified lease duration. In one embodiment, the lease server dynamically adjusts the lease duration based on an actual and/or anticipated load. The dynamic lease duration adjusts a tradeoff between alleviating the load with security in that a shorter lease duration means the client renews (i.e. authenticates itself) with the server more frequently. To progressively download/playback the media content, the client device can use one or more protocols, such as TCP, UDP, RTP, RTSP, RTCP, SSH, TLS/SSL, SIP, SDP, FTP, HTTP, and so forth. Other communication and/or transmission protocols yet to be developed can also be used. The media content can include video, audio, a game, an eBook, an application, an image, and so forth. The media content can be a movie, music, a game, audio (such as a music file), and/or a playlist of media files.

Upon the expiration of the lease duration, the lease server terminates the lease and releases the assigned slot. However, prior to the expiration of the lease duration, the client device can extend the lease duration by submitting a lease renewal request. The client device can also terminate the lease prior to the expiration of the lease duration by submitting a lease stop request. When the lease server receives the lease stop request, it terminates the lease and releases the assigned slot.

FIG. 4 illustrates an example flowchart for renewing an asset lease. According to one embodiment, the client device enforces the lease duration during the asset playback. The client device can enforce the lease duration in kernel space. In both examples, the client device terminates asset playback if the lease duration expires. However, the client device can extend the lease duration by sending a lease renewal request to the server. The consequence of a successful lease renewal is twofold: on the client device, the lease duration is extended for the particular asset; on the server, the lease expiration time (slot) is extended for the client device. The client device can store the lease information in kernel space to protect the integrity of the lease. In one variation, every time the client decrypts or decodes a part of the media, such as a frame in a movie, the client checks if the lease duration has expired. If the lease duration has expired, then all the security information is corrupted, which prevents future decryption or decoding; otherwise, the client continues to decrypt or decode the media.

As illustrated in FIG. 4, the client device first sends a lease renewal request to the server (402). When sending the lease renewal request to the server, the client device can use anti-replay protection to protect the message and ensure that the message cannot be replayed by an unauthorized party. According to one embodiment, the anti-replay protection includes several steps. First, the client device generates an HMAC key based on a global unique identifier, a random identifier, a client device type, and/or the current time. The client device then uses the HMAC key to compute a digest of the message. Next, the client device generates a second key based on the request type and/or the current time, as well as any other information, such as the digest generated above, global unique identifiers, and so forth. Finally, the client device uses the second key to encrypt the entire message, including the message digest created with the HMAC key.

Next, the server receives the lease renewal request and determines if a slot is currently assigned or allocated to the client device for the existing lease duration (404). If a slot is not currently assigned/allocated to the client device, the server acquires a slot for the client device (406) and initializes a slot timer for the client device (408). Alternatively, if a slot is already assigned or allocated to the client device, the server extends the slot timer for the client device (410). The slot timer can be based on a schedule, a setting, a policy, a user profile, a resource, a rule, an asset, etc.

The server then transmits new security information, a new lease key, and a new lease duration to the client device (412). The client device can receive the new security information, new lease key, and new lease duration for storage in kernel space. Here, the client device uses the stored information, which is protected against tampering, and enforces the lease duration accordingly. Once the client device receives the new security information, new lease key, and new lease duration, the client device can continue download/playback of the media content for the new lease duration (414).

In one variation, the renewal response does not contain the lease key. The lease key remains the same after the initial lease request, so the client device can send only a new duration in the lease renewal response. Of course, the client device can alternatively generate a new lease key each time. Thus, renewal requests can rely on a previously used lease key or can use a new lease key.

FIG. 5 illustrates an example flowchart for stopping an asset lease. The server first receives a lease stop request (502). In one embodiment, the lease stop request is a signal generated in response to an event. For example, the lease stop request can be an error indicating an interruption of media content download/playback. Alternatively, the lease stop request can be a message generated by the client device (e.g., FIN packet) in response to an event, such as an action by the user, a server event, a network event, an application event, etc. The client device can generate a lease stop request message when a user terminates download/playback of the media content. The client device can generate a lease stop request message after an idle session timeout. The client device can generate a lease stop request message when it detects a hardware, software, and/or network failure.

Next, the server determines if there is a slot currently assigned to the client device for the existing lease duration (504). If a slot is not assigned to the client device, the server sends a notification that there is nothing to release (506). On the other hand, if a slot is assigned to the client device, the server releases the slot assigned to the client device (508). Once the server releases the slot assigned to the client device, the client device cannot typically continue download/playback of the media content without acquiring a new lease through a lease start request. However, a crafty hacker might forge a stop request to free a slot. However, this means that the hacker's playback will timeout because he is unable to renew the lease without consuming a slot.

Figure 6:
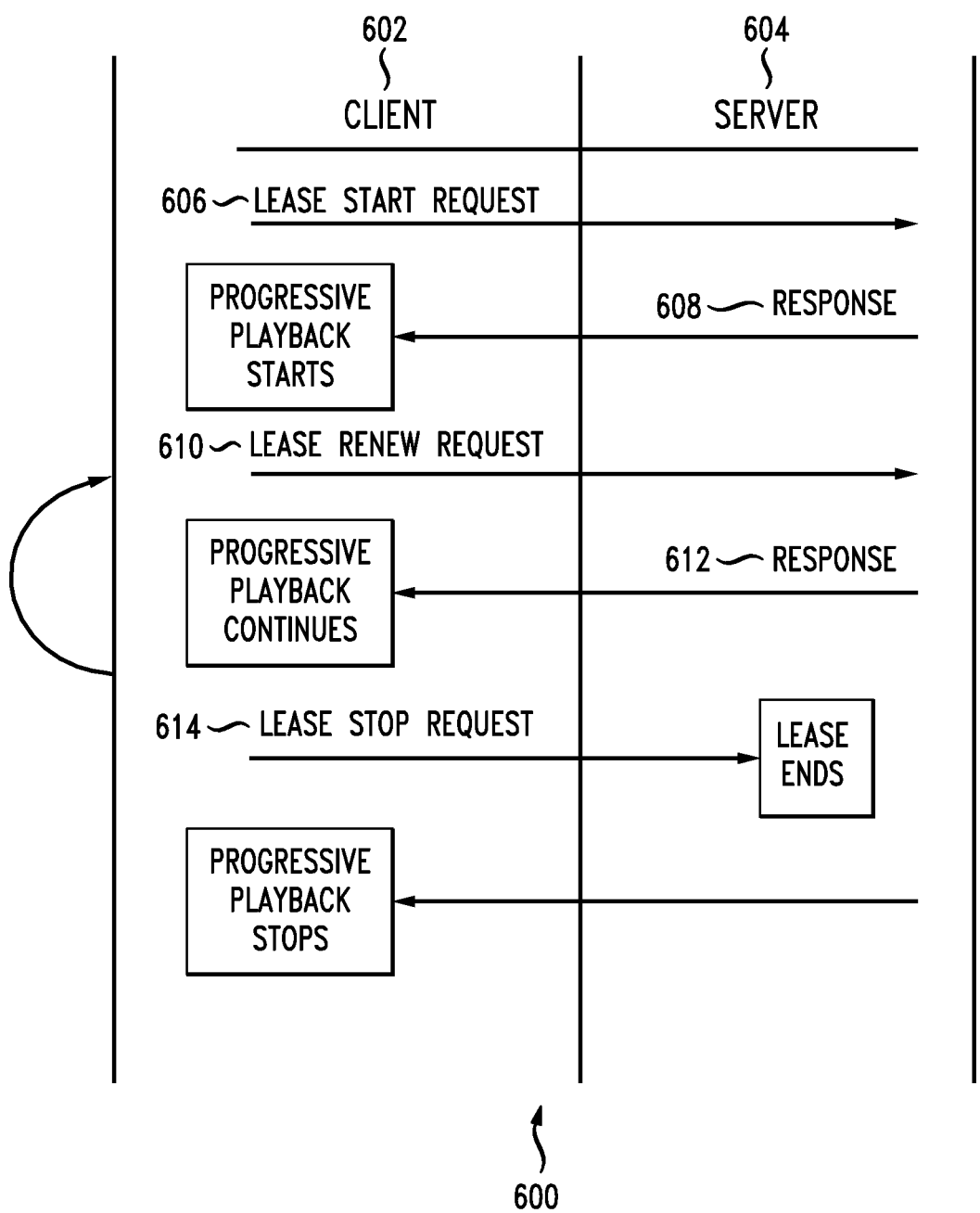
FIG. 6 illustrates communication exchanges between a client and a server in a sample asset lease management process.

FIG. 6 illustrates communication exchanges between a client 602 and a server 604 in a sample asset lease management process 600. In this example, the client 602 and the server 604 perform a series of communication exchanges which allow a user to lease a media asset on the server 604, and access the media asset from the client 602. For example, Messy Student may want to listen to a music playlist on the Internet while he cleans his room. Here, Messy Student can lease the music playlist from his media player and listen to the music playlist for the duration of the lease. The lease permits Messy Student to progressively download and play the music playlist while he cleans his room. As the end of the lease period approaches, the media player can transparently (e.g., without user interaction) extend the lease by sending a lease renewal request to the lease server, to allow Messy Student to continue listening to the music playlist beyond the original lease period. Further, Messy Student can configure the media player to use his user account to authorize the lease or otherwise associate the lease with Messy Student. The same principles apply to watching a single piece of video content as well. At some point in advance of the lease expiration, the playback device reaches out to request a renewal or extension of the lease while simultaneously continuing seamless playback for the user.

The client 602 can securely store the lease on kernel space to protect it from tampering. In one embodiment, the client 602 enforces the timeout period according to the lease. The client 602 can enforce the lease in kernel space to protect the lease from tampering. Moreover, the client 602 can use a hash function, an encryption algorithm, and/or a security key to secure the communication exchanges with the server 604.

In FIG. 6, the client 602 and the server 604 communicate over a network via one or more protocols, such as TCP, UDP, RTP, RTSP, RTCP, SSH, TLS/SSL, SIP, SDP, FTP, HTTP, and so forth. Other communication and/or transmission protocols yet to be developed can also be used. The client 602 can be any computing device with networking capabilities, such as, for example, a mobile phone, a laptop computer, a media player, etc. The server 604 can include one or more servers configured to perform asset lease management. The asset can include media content such as a video, an audio, a game, an application, an image, and so forth.

The client 602 first sends a lease start request 606 to the server 604. Here, the client 602 is associated with a user profile to allow the server 604 to authenticate/identify the lease start request 606, the client 602, and/or the user submitting the request. The client 602 can include a setting that associates the client 602 with the user profile. The user profile can include a setting that lists the client 602 as an authorized device. For example, Messy Student can configure his user profile to designate the client 602 as an authorized device. The client 602 can store the user account credentials and uses the credentials to authenticate with the server 604.

The client 602 can send the lease start request 606 in response to an action and/or event. The client 602 can send the lease start request 606 in response to a user action. For example, the client 602 can send the lease start request 606 in response to an attempt by Messy Student to lease/play a song stored on the server 604. The client 602 can send the lease start request 606 according to a schedule. The client 602 can send the lease start request 606 based on a determination that the lease is about to end, or a lease renew request for continuing to view the same media.

Next, the server 604 sends a response 608 to the client 602. The response 608 includes security information, a lease key, and a lease duration. According to one embodiment, the client 602 receives the security information, lease key, and lease duration and stores the information in kernel space. Here, the client 602 can use the stored information, which is protected against tampering, to enforce the lease duration. Moreover, the server 604 can hash and/or encrypt all or part of the response 608 sent to the client 602. For example, the server 604 can encrypt the response 608 using a private key. The client 602 can then decrypt the response 608 using the private key.

After receiving the response 608, the client 602 can start a progressive download of the asset for the lease duration. The security information and the lease key in the response 608 allow the client 602 to start a progressive download of the asset for a period specified by the lease duration. For example, Messy Student can select a music playlist that he wants to stream to his media player. In response, the media player can send a lease start request to a server hosting the music playlist and/or managing the leasing of the music playlist. When the server receives the lease start request, it generates a response that includes security information, a lease key, and a lease duration. The server then sends the response to the media player. Once the media player receives the response, it begins a progressive download of the music playlist. Messy Student can then listen to the music playlist for the time specified in the lease duration.

Before the end of the lease duration, the client 602 sends a lease renewal request 610 to the server 604 to allow the asset download/playback to continue beyond the lease duration. In one embodiment, the lease duration is set to be shorter than the playback duration of the asset in order to require the client 602 to renew the lease at least once throughout the playback duration of the asset. In our example above, the media player can transparently send a lease renewal request to the server to extend the lease duration and allow Messy Student to continue listening to the music playlist. Moreover, the media player can renew the lease more than once until the end of the playback duration. If the client 602 does not renew the lease before the end of the lease duration, the server 604 terminates the lease and releases the slot assigned to the client 602. Moreover, an expired lease duration can cause the client 602 to destroy or corrupt all security information associated with decoding or playback of the asset. This frustrates attack and forgery attempts, as the lease renewal requirement can serve as a second layer of protection. This also prevents a stale or unused lease from tying resources such as slots, leases, sessions, services, etc., and allows the server 604 to reassign such resources to service new/active requests.

For example, Messy Student starts a lease from his media player for a music playlist on the server. Subsequently, Messy Student's media player loses network connectivity, interrupting Messy Student's access to the music playlist. Instead, Messy Student grabs his laptop and attempts to watch a movie, thereby implicitly requesting a lease from the server. If Messy Student's prior lease is not promptly released, the server may not immediately have another lease/resource to allow Messy Student to lease the movie from his laptop. This would be the case, for example, if Messy Student reaches a maximum number of leases permitted by the server, or if the prior lease occupies the last slot on the server. However, by requiring the prior lease to be renewed throughout the playback duration, the server can ensure that inactive leases/devices do not unnecessarily occupy server resources, such as leases, sessions, slots, etc., beyond the length of the lease duration. Here, the server would terminate the prior lease at the end of the lease duration, freeing the prior lease and resources used by the prior lease. The server can then reassign the slot and/or prior lease to allow Messy Student to lease the movie from his laptop.

When sending the lease renewal request 610 to the server 604, the client 602 can use anti-replay protection to secure the message and ensure that the message cannot be replayed by an unintended party. In one embodiment, the anti-replay protection includes several steps. First, the client 602 generates an HMAC key based on a global unique identifier, a random identifier, a client device type, a digest, a global unique identifier, and/or the current time. Another layer of encryption with an obfuscated secret key can also be applied to the HMAC key. The client 602 then uses the HMAC key to compute a digest of the message. Next, the client 602 generates an anti-replay key based on the request type and/or the current time. Finally, the client 602 uses the anti-replay key to encrypt the entire message, including the message digest created with the HMAC key. The server 604 also derives the same keys to check and decrypt messages from the client 602.

Next, the server 604 receives the lease renewal request 610 and sends a response 612 to the client 602. The response 612 includes new security information, a new lease key, and a new lease duration. The client 602 receives the response 612, and continues the progressive download/playback. The client 602 can repeat this process until the end of the asset playback duration. In one embodiment, the lease renewal request 610 and the response 612 are generated transparently, without the user's input. For example, the client 602 can automatically generate the lease renewal request 610 if the asset is downloading or playing at a specified time prior to the end of the lease.

The server 604 then receives the lease renewal request 610, generates the response 612, and sends the response 612 to the client 602. The client 602 receives the response 612 and continues playback without interruption. In our earlier example, while Messy Student listens to the music playlist, the media player can automatically generate the lease renewal request 610 and send it to the server 604 to avoid an interruption at the end of the lease duration. The client 602 receives the response 612 from the server 604 and extends the lease duration, unbeknownst to Messy Student, who is still listening to the music playlist. Messy Student can then continue listening to the music playlist beyond the original lease duration. The media player can continue these steps. For example, the media player can continue sending lease renewal requests and extending the lease duration until the music playlist has finished playing.

Finally, the client 602 can optionally send a lease stop request 614 to the server 604 to terminate the lease before the end of the lease duration. When the server 604 receives the lease stop request 614, it terminates the lease and releases the slot. Once the lease ends, progressive playback stops for the particular asset.

Having disclosed some basic system components and concepts, the disclosure now turns to the exemplary method embodiments shown in FIGS. 7, 8, 9, 10, and 11. For the sake of clarity, each method is discussed in terms of an exemplary system 100 as shown in FIG. 1 configured to practice the method. The steps outlined herein are exemplary and can be implemented in any combination thereof, including combinations that exclude, add, or modify certain steps.

Figure 7:
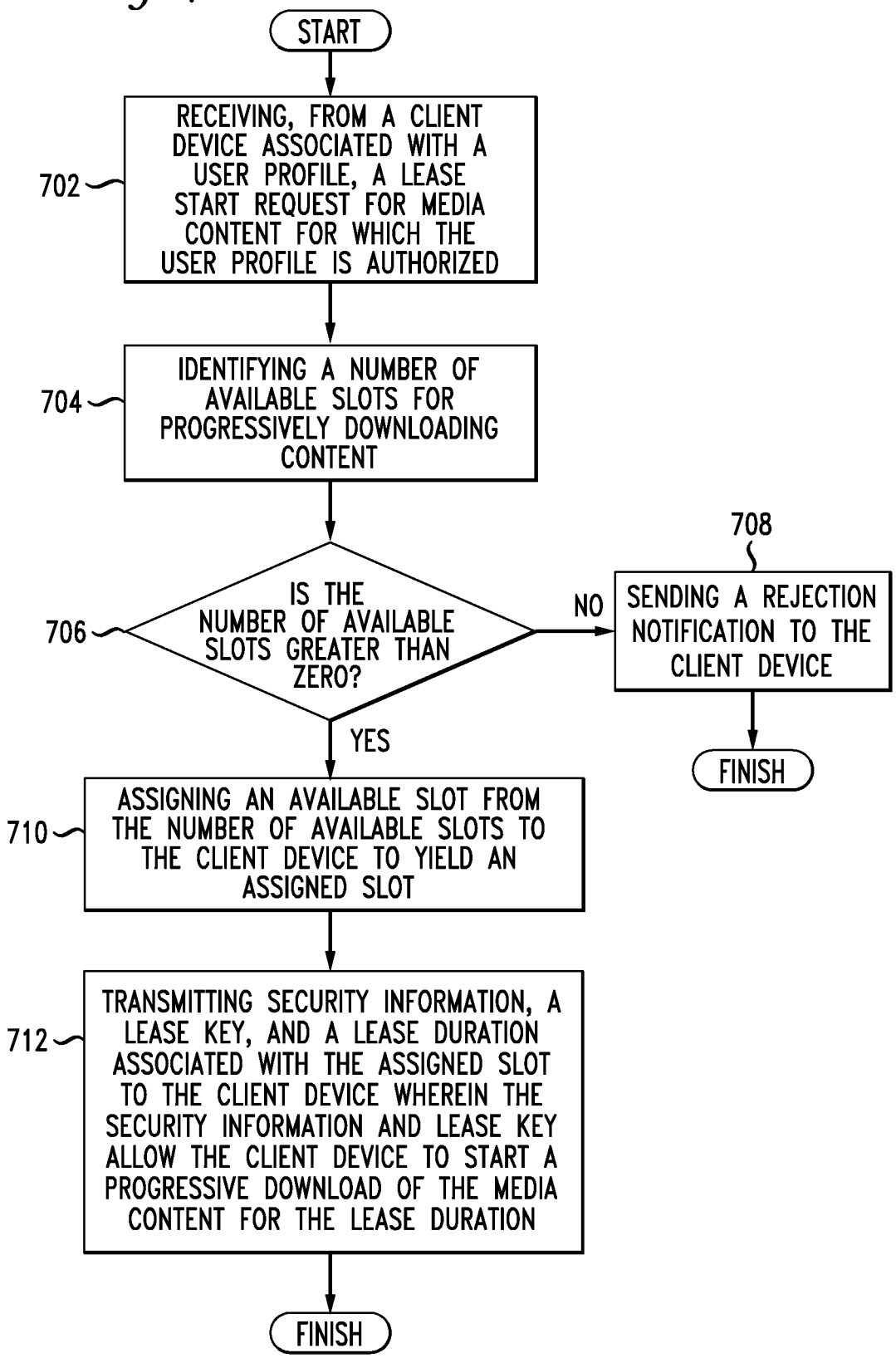
FIG. 7 illustrates a first example method embodiment for starting an asset lease.

FIG. 7 illustrates a first example method embodiment for starting an asset lease. The system 100 first receives, from a client device associated with a user profile, a lease start request for media content for which the user profile is authorized (702). A user profile can include a user name, a user identifier, a user group, a global user identifier, a device identifier, etc. The system 100 can use the user profile to authenticate the lease start request, identify the client device, and/or identify the user submitting the request. The user profile can also be used by a user and/or client device to authorize a lease start request.

A user can authorize the lease start request by verifying the account credentials configured for his or her user profile. For example, before transmitting the lease start request to the system 100, the client device can prompt the user to authorize/authenticate the lease start request by entering his or her account credentials. The client device can then provide the authentication information to the system 100. A user profile can be linked to the client device such that the client device is authorized to obtain an asset lease from the system 100 for the specific user profile. For example, the user profile can include a preference setting that defines the client device as an authorized device for that user profile. The system 100 can then use the user profile to validate the lease start request from the client device by comparing the client device with the preference setting. In yet another embodiment, the client device includes user profile information in the lease start request header, which associates the lease start request with the user profile.

The system 100 then identifies a number of available slots for progressively downloading content (704). A slot can be a lease, a session, a resource, a node, a schedule, a thread, an object, a module, a transmission medium, and so forth. The system 100 can check if a session is available for servicing the lease start request. The system 100 can check the status of one or more network nodes to determine if a network node is available for servicing the lease start request. The system 100 can check the status of a media asset and determines, based on a system load, whether the system 100 can service the lease start request. The system 100 can check if a lease is available on a lease server to determine if a lease can be provided to the client device.

Next, the system 100 determines if the number of available slots is greater than zero (706). If the number of slots is not greater than zero, the system 100 sends a rejection notification to the client device (708) and the method finishes. On the other hand, if the number of slots is greater than zero, the system 100 assigns an available slot from the number of available slots to the client device to yield an assigned slot (710). The system 100 then transmits security information, a lease key, and a lease duration associated with the assigned slot to the client device, wherein the security information and the lease key allow the client device to start a progressive download of the media content for the lease duration (712).

Figure 8:
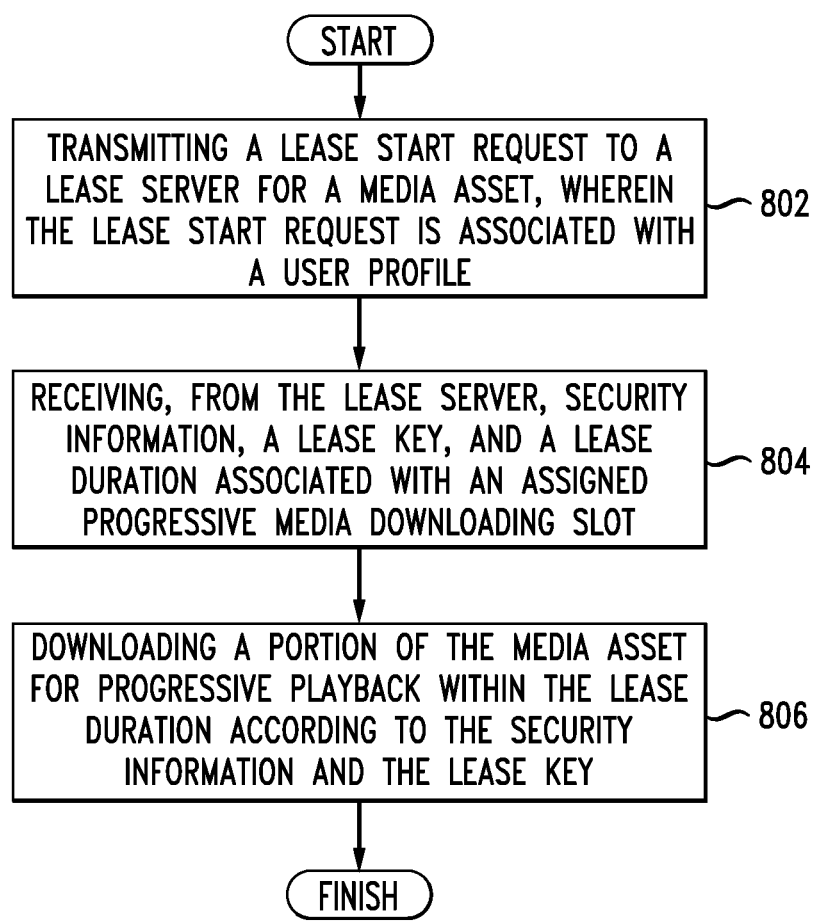
FIG. 8 illustrates a second example method embodiment for starting an asset lease.

FIG. 8 illustrates a second example method embodiment for starting an asset lease. The system 100 transmits a lease start request to a lease server for a media asset, wherein the lease start request is associated with a user profile (802). The system 100 can generate and/or transmit the lease start request in response to an action and/or event. In one embodiment, the system 100 generates the lease start request in response to an action by the user. For example, the system 100 can generate and send the lease start request in response to an attempt by the user to play a song stored on the lease server. Alternatively, the system 100 generates the lease start request in response to a request from another device. The system 100 can also generate the lease start request according to a schedule.

The system 100 then receives, from the lease server, security information, a lease key, and a lease duration associated with an assigned progressive media downloading slot (804). The security information can include an operation identifier, a request identifier, a function, a lease identifier, a portion of a key, a credential, a resource identifier, a globally unique identifier, an account identifier, an address, etc. The security information can include a portion of the lease key and/or a message digest.

The lease key is a security key that protects the lease information. The lease key indirectly decrypts the encrypted content, such as a movie. The other components, such as the digest and the anti-replay key, verify and protect the message crafted by the server and subsequently transmitted to the client, respectively. Further, the lease key can be used to verify the integrity and authenticity of the lease information. In one embodiment, the lease duration is shorter than the playback duration of the media asset. Consequently, the system 100 must renew the lease at least once to play the media asset for the entire playback duration. This way, the lease server can terminate a stale/unused lease and release the slot assigned to the stale/unused lease prior to the end of the playback duration of the media asset. The lease duration can be based on a policy, a schedule, a media asset, a server load, a request type, a current time, etc.

The security information, lease key, and/or lease duration can be hashed and/or encrypted to protect against tampering and/or forgery. Also, the security information, lease key, and/or lease duration can be stored in protected space on the system 100. According to one embodiment, the system 100 receives the security information, lease key, and lease duration and stores the information in kernel space. The system 100 can use the stored information, which is protected against tampering, to enforce the lease duration.

Finally, the system 100 downloads a portion of the media asset for progressive playback within the lease duration according to the security information and the lease key (806). The system 100 can download the portion of the media asset from the lease server or another server specified by the lease information and/or the lease server. In one scenario, all portions of the media asset are encrypted and can only be decrypted with the lease key and/or other corresponding security information.

Figure 9:
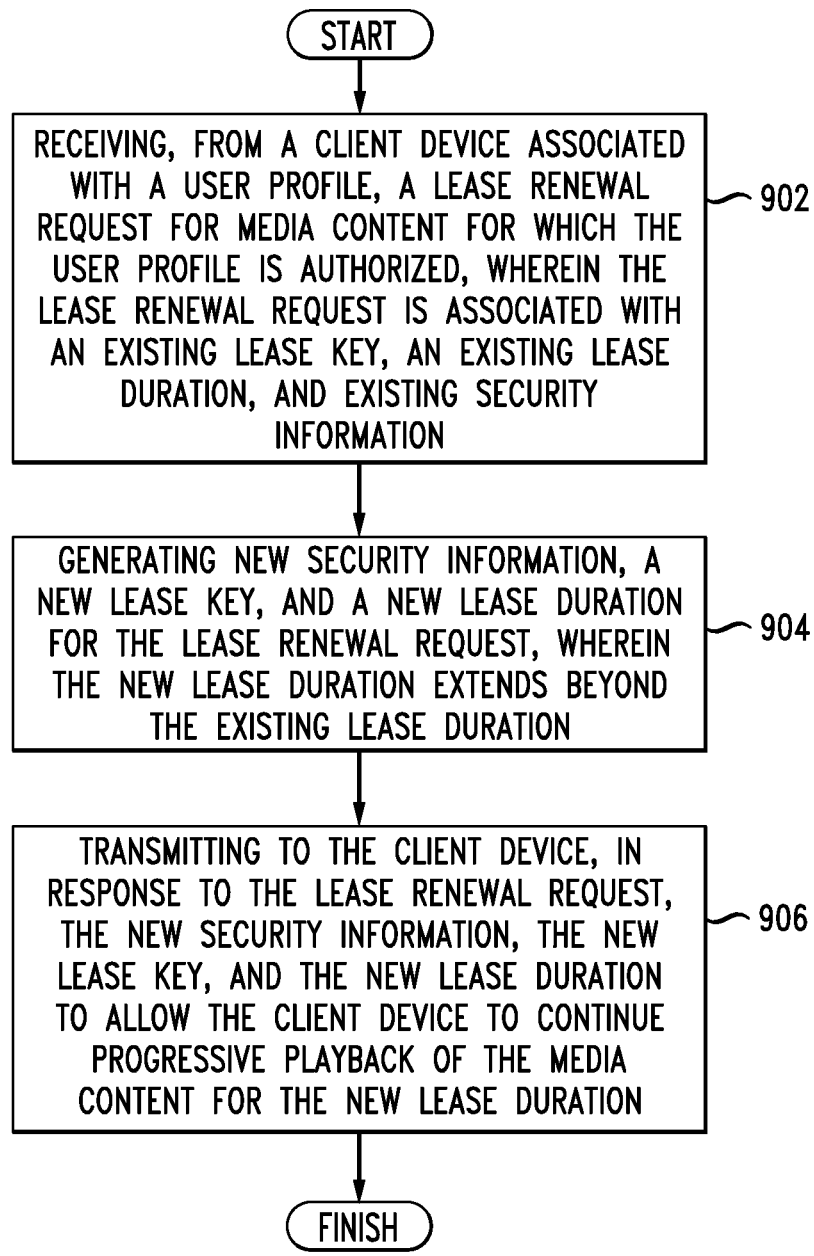
FIG. 9 illustrates a first example method embodiment for renewing an asset lease.

FIG. 9 illustrates a first example method embodiment for renewing an asset lease. The lease server receives, from a client device associated with a user profile, a lease renewal request for media content for which the user profile is authorized, wherein the lease renewal request is associated with an existing lease key, an existing lease duration, and existing security information (902). The lease renewal request can include portions of hashed, encrypted, and/or unencrypted information. The lease renewal request can be encrypted with a private key. An HMAC key can be is used to compute a digest of the lease renewal request. The digest and the lease renewal request are then encrypted with an anti-replay key. Here, the HMAC key is based on a global unique identifier, a random identifier, a client device type, the digest, the global unique identifier, and/or the current time. The anti-replay key is based on the request type and/or the current time. In one common variation, the lease renewal request is protected in the same way as the original lease request. However, for a renewal, the lease key can remain the same, but the lease duration is simply extended. The lease key may not be updated because the content, having been downloaded, must be decrypted with the same lease key.

Next, the lease server generates new security information, a new lease key, and a new lease duration for the lease renewal request, wherein the new lease duration extends beyond the existing lease duration (904). Finally, the lease server transmits the new security information, the new lease key, and the new lease duration to the client, to allow the client device to continue progressive playback of the media content for the new lease duration (906). The lease server can repeat steps 902 through 906 as necessary until the end of the playback duration of the media content.

Figure 10:
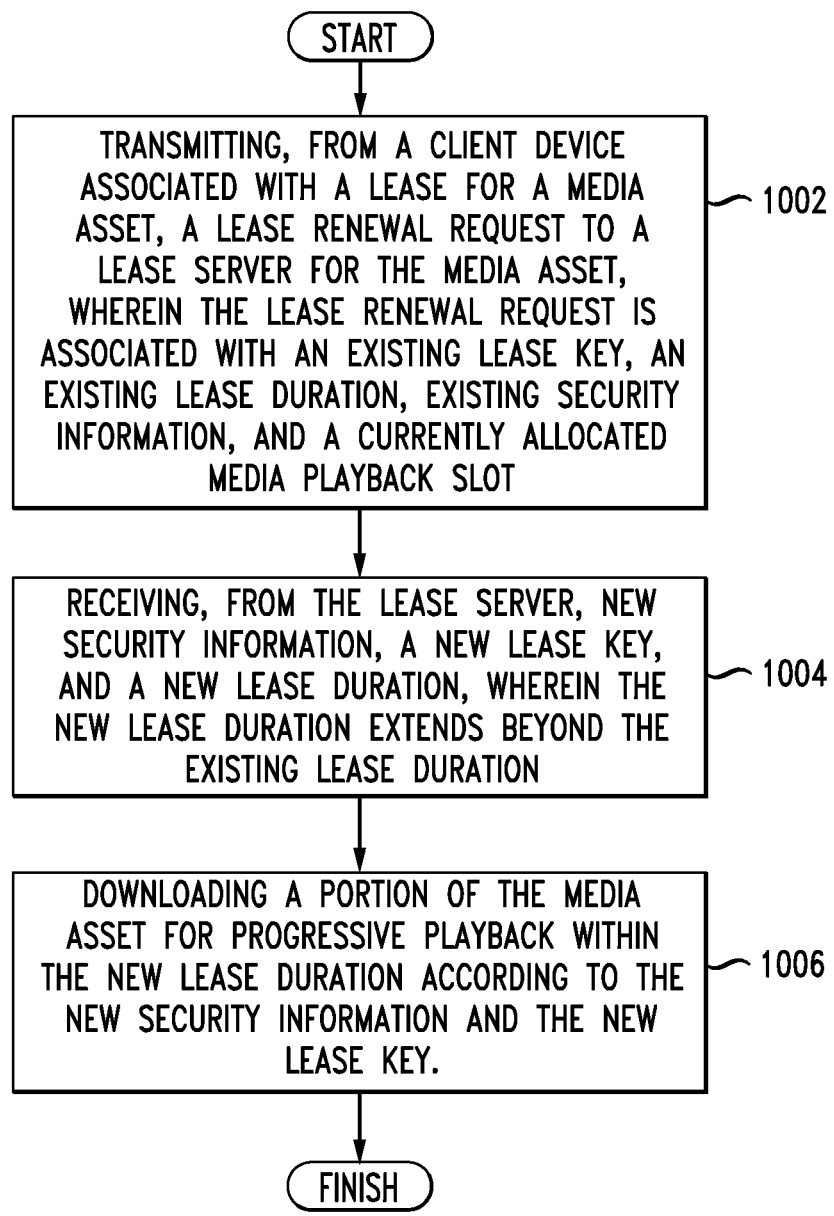
FIG. 10 illustrates a second example method embodiment for renewing an asset lease.

FIG. 10 illustrates a second example method embodiment for renewing an asset lease. Here, the system 100 is a client device associated with a lease for a media asset. The system 100 first transmits a lease renewal request to a lease server for the media asset, wherein the lease renewal request is associated with an existing lease key, an existing lease duration, existing security information, and a currently allocated media playback slot (1002). Next, the system 100 receives, from the lease server, new security information, a new lease key, and a new lease duration, wherein the new lease duration extends beyond the existing lease duration (1004). Finally, the system 100 downloads a portion of the media asset for progressive playback within the new lease duration according to the new security information and the new lease key (1006).

Figure 11:
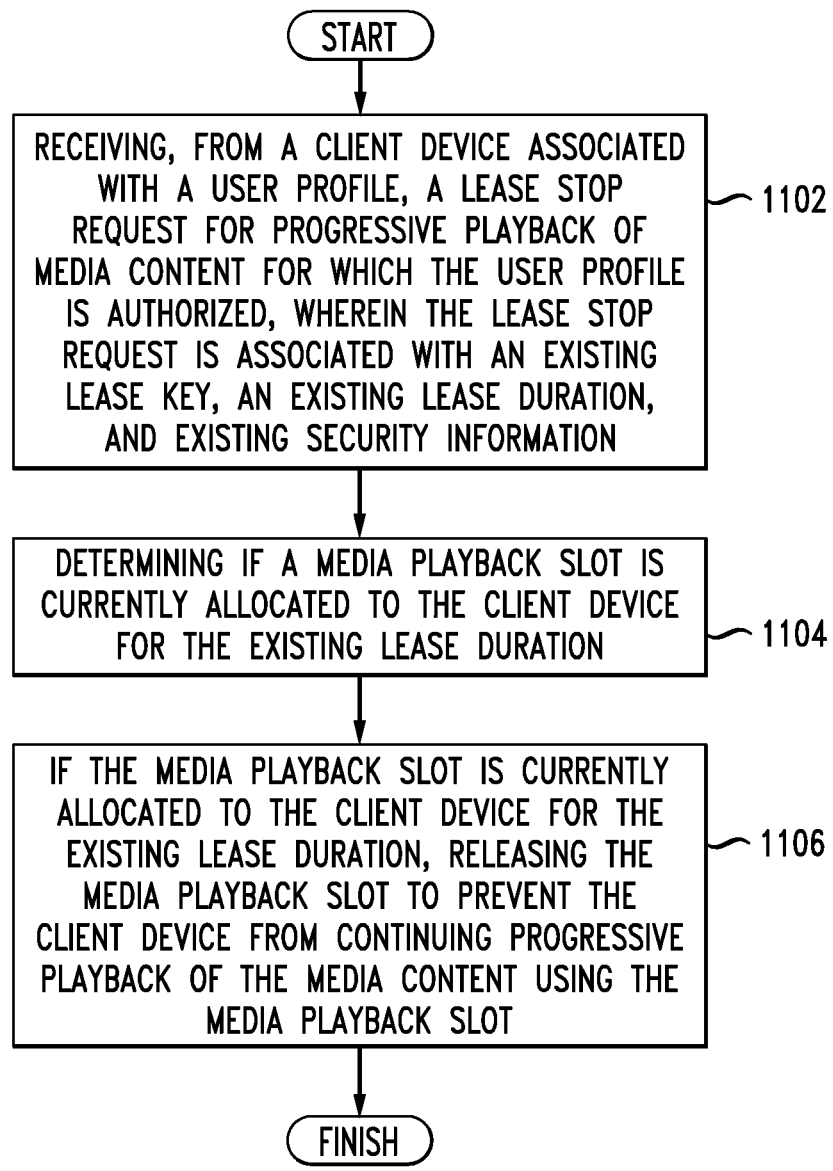
FIG. 11 illustrates an example method embodiment for stopping an asset lease.

FIG. 11 illustrates an example method embodiment for stopping an asset lease. As shown in FIG. 11, the lease server first receives, from a client device associated with a user profile, a lease stop request for progressive playback of media content for which the user profile is authorized, wherein the lease stop request is associated with an existing lease key, an existing lease duration, and existing security information (1102). Next, the lease server determines if a media playback slot is currently allocated to the client device for the existing lease duration (1104). If the media playback slot is currently allocated to the client device for the existing lease duration, the lease server releases the media playback slot to prevent the client device from continuing progressive playback of the media content using the media playback slot (1106). The purpose of releasing the slot is to prevent a client from tying up a slot. The player will have stopped the playback intentionally upon issuing a stop request, or it will time out (if a stop request was forged). The time-out mechanism essentially hinders a rogue user from continuing to playback a leased asset for long periods after sending a forged stop request.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to virtually any asset lease management task in any situation. Those skilled in the art will readily recognize various modifications and changes that may be made to the principles described herein without following the example embodiments and applications illustrated and described herein, and without departing from the spirit and scope of the disclosure.

We claim:
1. A method comprising:
 receiving, from a client device associated with a user profile, a lease start request for media content for which the user profile is authorized;
 identifying a number of available slots for progressively downloading content;
 when the number of available slots is greater than zero:
  assigning an available slot from the number of available slots to the client device to yield an assigned slot for progressively downloading content; and
  transmitting security information, a lease key, and a lease duration associated with the assigned slot to the client device in response to the lease start request, wherein the security information and lease key allow the client device to start a progressive download of the media content via the assigned slot for the lease duration, wherein the lease duration is selected based on a playback duration of the media content, and wherein the lease duration is shorter than the playback duration of the media content;

receiving, from the client device, a lease renewal request for the media content, wherein the lease renewal request is received before the lease duration expires; and transmitting, in response to the lease renewal request, a new lease duration associated with the assigned slot, wherein the new lease duration is selected based on a remaining playback duration of the media content, and wherein the new lease duration is shorter than or equal to the remaining playback duration of the media content.

2. The method of claim 1, further comprising providing a replacement lease key and a replacement lease duration in response to the lease renewal request.

3. The method of claim 1, wherein the security information is transmitted to the client device for storage in kernel space at the client device.

4. The method of claim 1, further comprising dynamically adjusting the lease duration based on at least one of an actual server load and anticipated server load.

5. The method of claim 1, wherein the assigned slot is automatically released upon expiration of the lease duration.

6. The method of claim 1, wherein the security information includes a portion of the lease key.

7. The method of claim 1, wherein the media content comprises at least one of a video, audio, game, an application, and an image.

8. A system comprising:
a processor; and
a memory storing instructions which, when executed by the processor, cause the processor to perform operations comprising:
transmitting a lease start request to a lease server for a media asset, wherein the lease start request is associated with a user profile;
receiving, from the lease server, security information, a lease key, and a lease duration associated with an assigned slot for progressively downloading content, wherein the lease duration is shorter than a playback duration of the media asset;
downloading a portion of the media asset for progressive playback within the lease duration according to the security information and the lease key,
sending a lease renewal request to the lease server for the media asset, wherein the lease renewal request is sent before the lease duration expires; and
receiving, in response to the lease renewal request, a new lease duration associated with the assigned slot, wherein the new lease duration is selected based on a remaining playback duration of the media asset, and wherein the lease duration is shorter than or equal to the remaining playback duration of the media asset.

9. The system of claim 8, wherein the security information includes a portion of the lease key.

10. The system of claim 8, the memory storing additional instructions which, when executed by the processor, result in operations further comprising enforcing the new lease duration.

11. The system of claim 8, wherein at least one of the security information, the lease key, and the lease duration is stored in kernel space.

12. The system of claim 8, wherein the media asset comprises at least one of a video, audio, game, an application, an eBook, and an image.

13. The system of claim 8, wherein the system comprises a client device, and wherein, in order to continue progressive playback of the media asset beyond the lease duration, the client device is required to send a lease renewal request before the lease duration expires.

14. A non-transitory computer-readable storage medium storing instructions which, when executed by a processor, cause the processor to perform operations comprising:
receiving, from a client device associated with a user profile, a lease renewal request for media content for which the user profile is authorized, wherein the lease renewal request is associated with an existing lease key, an existing lease duration, and existing security information, wherein the existing lease duration is shorter than or equal to a remaining playback duration of the media content;
generating new security information, a new lease key, and a new lease duration for the lease renewal request, wherein the new lease duration extends beyond the existing lease duration; and
transmitting to the client device, in response to the lease renewal request, the new security information, the new lease key, and the new lease duration to allow the client device to continue progressive playback of the media content for the new lease duration.

15. The non-transitory computer-readable storage medium of claim 14, wherein a currently allocated media playback slot associated with the client device is automatically released once the new lease duration has expired.

16. The non-transitory computer-readable storage medium of claim 14, storing additional instructions which, when executed by the processor, result in operations further comprising:
determining if a media playback slot is currently assigned to the client device for the new lease duration; and
if the media playback slot is not currently assigned to the client device for the new lease duration:
assigning an available media playback slot to the client device to yield an assigned slot; and
transmitting the new lease duration associated with the assigned slot to the client device.

17. A method comprising:
transmitting, from a client device associated with a lease for a media asset, a lease renewal request to a lease server for the media asset, wherein the lease renewal request is associated with an existing lease key, an existing lease duration, existing security information, and a currently allocated media playback slot, wherein the existing lease duration is shorter than a playback duration of the media asset;
receiving, from the lease server, new security information, a new lease key, and a new lease duration, wherein the new lease duration extends beyond the existing lease duration, and wherein the new lease duration is shorter than or equal to a remaining playback duration of the media asset; and
downloading a portion of the media asset for progressive playback within the new lease duration according to the new security information and the new lease key.

18. The method of claim 17, wherein at least one of the new security information, the new lease key, and the new lease duration is stored in kernel space.

19. The method of claim 17, wherein the new security information includes a portion of the new lease key.

20. The method of claim 17, wherein the lease renewal request is transmitted prior to an end of the existing lease duration.

* * * * *